Patented Feb. 17, 1925.

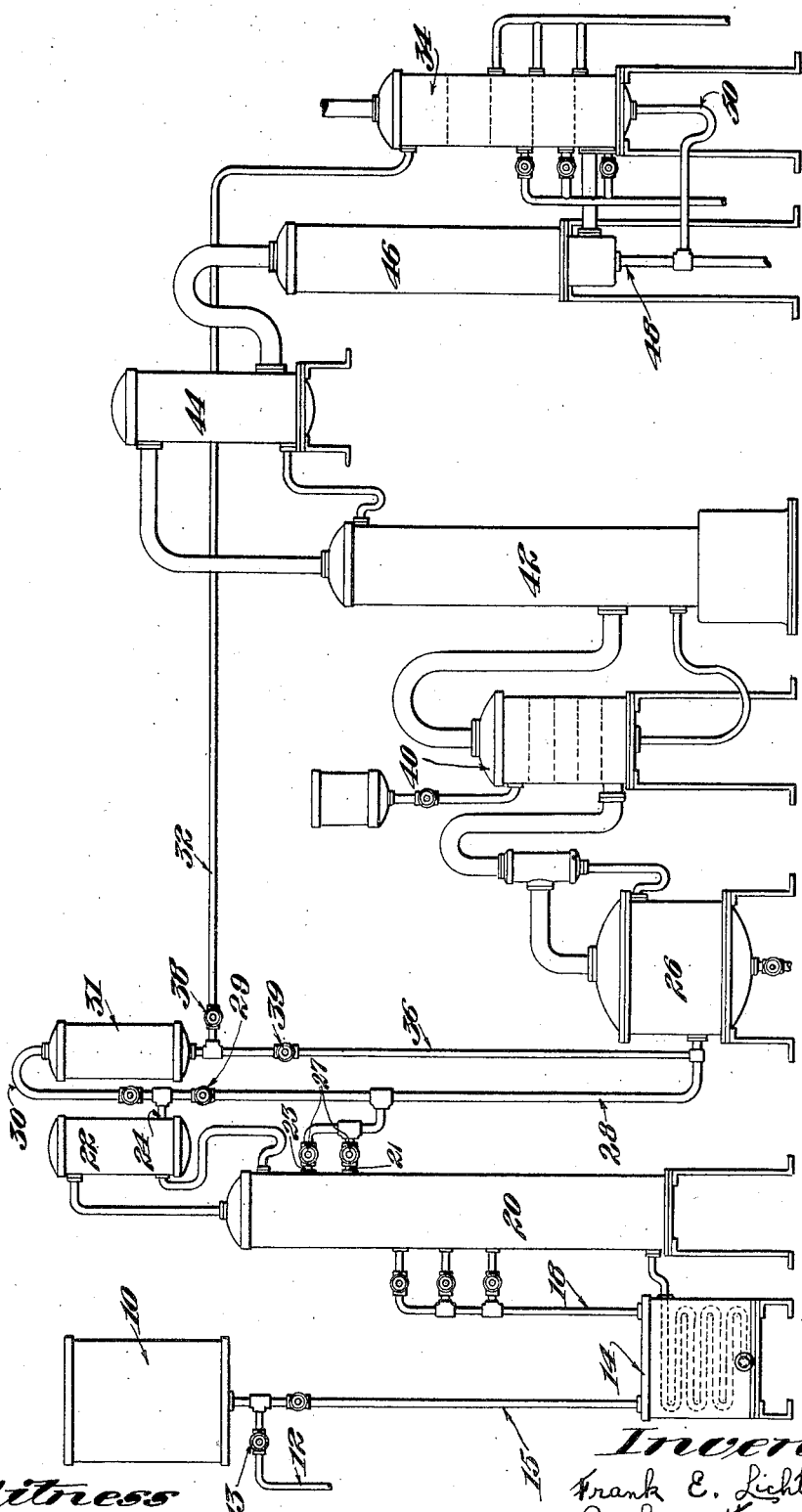

1,527,144

UNITED STATES PATENT OFFICE.

FRANK E. LICHTENTHAELER, OF NEWTON HIGHLANDS, MASSACHUSETTS.

PROCESS OF MANUFACTURING ALCOHOL-ETHER MIXTURES.

Application filed August 6, 1921. Serial No. 490,208.

*To all whom it may concern:*

Be it known that I, FRANK EDWARD LICHTENTHAELER, a citizen of the United States, residing at Newton Highlands, in the county of Middlesex and State of Massachusetts, have invented certain new and useful Improvements in Processes of Manufacturing Alcohol-Ether Mixtures; and I do hereby declare the following to be a full, clear, and exact description of the invention, such as will enable others skilled in the art to which it appertains to make and use the same.

This invention relates to a process for the manufacture of alcohol-ether mixtures and more particularly to a process for the direct production of alcohol-ether mixtures from raw materials containing sugars or starches.

The object of the invention is to provide a novel and improved process for the direct production of alcohol ether mixtures from raw materials containing sugars or starches, such as molasses, grains, potatoes, etc.

At the present time alcohol-ether mixtures are made by mechanically mixing liquid ether and liquid alcohol. This necessitates the manufacture of liquid alcohol and also the manufacture of liquid ether, both processes being separate and distinct. Ether is manufactured by the action of sulphuric acid upon alcohol, and in view of the present laws of the United States relating to the manufacture of alcohol it is desirable to immediately denature the alcohol when formed, prior to its manufacture into ether. In the United States at the present time a certain proportion of ether is used as a denaturant, so that the manufacture of alcohol-ether mixtures at the present time involves the manufacture of liquid alcohol from the raw materials, the production of ether from a portion of the alcohol, and thereafter the mixture of the ether thus produced with additional alcohol to form the desired alcohol-ether mixtures. The denaturing operations involve the use of special denaturing tanks and apparatus; interrupt the continuity of manufacture and consequently increase the cost of manufacture of the final alcohol-ether mixture. Furthermore, all of the operations of denaturing must, in order to comply with the law, be carried out under the supervision of Government agents.

According to the present invention alcohol-ether mixtures are made directly from raw material containing sugars or starches, and alcohol as such does not constitute a product of the process and is never stored in bulk as such. The process is carried out in a complete system of apparatus and as fast as the alcohol is formed in the process, one portion thereof is made directly into ether vapor. The ether vapor thus produced is then absorbed in the remaining portion of the alcohol so that the final and sole product of the process is an alcohol-ether mixture. In this manner the operations of producing the alcohol, denaturing it with ether, producing ether from a portion of the alcohol, and finally producing an alcohol-ether mixture, are merged into a single closed continuous process carried out within a continuous system of apparatus, which is intended to eliminate the manufacturing expense and difficulties encountered with the separate denaturing operation.

The drawing illustrates diagrammatically an apparatus in which the improved process is preferably carried out.

Referring to the drawing, the mash of fermented raw material, such as molasses, grain, potatoes, etc., is pumped into a supply tank 10 through a feed pipe 12, the valve 13 therein being opened. After the tank 10 has thus been filled, the valve 13 is closed and the mash is fed by gravity to a continuous still 20 of ordinary and well-known construction through a down pipe 15 to a preheater 14, and through a pipe 18. The mash is heated during its passage through the preheater 14 by the waste heat from the spent liquor from the still 20. The still 20 is provided with the usual reflux condenser 22 and operates to fractionate the vapors of alcohol and water to concentrate the alcohol to approximately 95 per cent.

In order to convert a portion of the alcohol produced by the distillation of the mash of fermented raw material into ether vapor, provision is made for withdrawing a purified effluent comprising 95 per cent alcohol from an intermediate portion of the still 20, and for this purpose outlet pipes 21, 23 are provided leading directly to a down pipe 28 leading to the ether generator 26. Suitable valves 27 are provided in each of the pipes 21, 23 to control the flow of the alcohol therethrough. The head fractions from the still 20 containing low boiling impurities, together with the remaining portion of the alcohol vapor produced by the distillation operation are condensed within a final condenser 31 thus forming a concentrated liquid alcohol of varying degrees of purity. The liquid alcohol from the condenser 31 is conducted through a pipe 32 to an absorber 34 where it is utilized to absorb the ether vapors produced within the generator 26, as will be described, to form an alcohol ether mixture. It is particularly desirable that the alcohol used for the generation of ether be free from the low boiling impurities contained in the head fractions in order that excessive consumption of the sulphuric acid used in the ether generator for the formation of the ether vapor may be prevented, so that in the preferred manner of operation of the apparatus, a control valve 29 in the upper part of the down pipe 28 will be closed and the alcohol for the ether manufacture will be withdrawn from the still 20 through the pipes 21, 23 in a purified form free from the head fractions from the still. Of course if the maximum economy in the manufacture of the ether vapor is not desired, all of the alcohol vapor may be withdrawn from the top of the still 20, and one portion of the more or less impure alcohol vapor leaving the reflux condenser 22 through the outlet pipe 24 be passed directly into the ether generator through the down pipe 28 or, if desired, all of the alcohol vapor leaving the condenser 22 through the pipe 24 may be first condensed in the condenser 31, and thereafter a portion of the liquid alcohol led through a pipe 36 to the ether generator 26. Suitable valves 37, 38, 39 afford regulation of the quantities of alcohol passing through their respective pipes.

The use of alcohol ether mixtures for motor fuel purposes is at the present time largely confined to countries having tropical or very warm climates. In such countries the available condensing water is relatively warm, oftentimes approaching 80 to 85 degrees F., and accordingly the absorption of the ether vapor produced by the generator 26 in the liquid alcohol emerging from the condenser 31 through the pipe 32 will preferably be accomplished by apparatus diagrammatically illustrated in the drawing, and according to the method disclosed and claimed in an application filed by me on May 28, 1921, bearing Serial No. 473,430. According to that method the ether vapors leaving the generator 26, together with considerable undecomposed alcohol and water produced by the reaction are neutralized and concentrated by passage through a scrubber 40, a fractionating column 42, and a reflux condenser 44, all of well-known construction and such as are at present commonly employed in the manufacture of ether. From the condenser 44 the concentrated ether vapors are led through an elongated condenser 46 of any usual or preferred construction and by which a maximum amount of ether is condensed through the medium of the available condensing water even though as warm as 80 to 85 degrees F. The condensed ether leaves the condenser 46 through a down pipe 48 and the uncondensed ether vapors are conducted to the absorbing tower 34, where they encounter the stream of liquid alcohol entering the top of the absorber 34 through the pipe 32. In this manner the uncondensed ether vapors are absorbed within the absorber 34 directly into liquid alcohol forming a more or less dilute mixture of alcohol and ether. The alcohol-ether mixture within the absorber 34 is preferably water cooled and is conducted from the absorber through the down pipe 50 to the down pipe 48 where it unites with the substantially pure ether coming from the condenser 46 to form an alcohol-ether mixture suitable for motor fuel or other purposes.

From the above description it will be observed that the present invention contemplates a process for the direct production of alcohol ether mixtures from the raw material, such as a fermented mash of material containing sugars or starches within a closed system of apparatus, so that the sole product of the process is an alcohol-ether mixture.

While the ether generating and absorbing apparatus preferably comprises that illustrated in the drawing, it is to be understood that other forms of apparatus may be used particularly where the temperature of condensing water permits the ether vapors to be absorbed directly in the alcohol, or completely condensed.

Having thus described the invention, what is claimed is:—

1. The method herein described of manufacturing ether-alcohol motor fuel consisting in first distilling fermented mash, converting a part of the distillate into liquid ether, condensing the remaining part of said distillate into liquid alcohol, and mixing this alcohol with the liquid ether, these several steps being carried out continuously in a closed system, whereby the raw materials are converted into alcohol-ether motor fuel by a single continuous process, thereby avoiding handling either the ether or the alcohol as such.

2. The method herein described of manufacturing alcohol-ether motor fuel consisting in first continuously distilling fermented mash to produce alcohol, continuously converting a part of said alcohol into ether vapor, continuously condensing a part of said ether vapor into liquid ether and permitting the remaining uncondensed vapor to pass over and become absorbed and condensed in the remaining part of the alcohol, and finally continuously delivering this mixture of alcohol and ether into the stream of ether liquid coming from the condenser, for the purposes set forth.

3. The method of manufacturing alcohol-ether motor fuel which consists in continuously distilling fermented mash in a distilling column, drawing off a portion of the alcohol distillate in vapor form and making it into ether, and reuniting the ether portion with the remainder of the alcohol distillate to form alcohol-ether mixture.

4. The method of manufacturing alcohol-ether motor fuel which consists in continuously distilling fermented mash in a distilling column, drawing off a portion of the alcohol distillate and making it into ether, condensing a part of such ether, condensing the other portion of the alcohol distillate from the column, absorbing the remaining ether vapor in the condensed alcohol distillate, and joining the streams of condensed ether and condensed alcohol containing absorbed ether.

5. The process of manufacturing alcohol-ether motor fuel which consists in distilling fermented mash in a column still, removing alcohol from that zone of the still where it occurs of the desired strength, making it into ether, condensing the final distillate of the still and mixing it with the ether.

6. The process of manufacturing alcohol-ether motor fuel which consists in distilling fermented mash in a column still, drawing off alcohol from the still at the zone of approximately 95% alcohol, making it into ether, further distilling the vapors above such zone, condensing them and mixing the ether therewith.

7. The process of making alcohol-ether motor fuel which consists in distilling fermented mash in a distilling column, drawing off purified alcohol liquid from the column at a point between the top of the column and the point of introduction of the mash, making such purified alcohol into ether, drawing off heads alcohol vapor from the top of the column, condensing it and reuniting the streams of heads alcohol and ether to form motor fuel.

FRANK E. LICHTENTHAELER.